United States Patent
Wills et al.

(10) Patent No.: US 10,193,814 B2
(45) Date of Patent: Jan. 29, 2019

(54) METHOD AND APPARATUS FOR CATEGORIZING A DOWNLOAD OF A RESOURCE

(71) Applicant: Openwave Mobility Inc., Redwood City, CA (US)

(72) Inventors: Fergus M Wills, Belfast (GB); Matt Halligan, Belfast (GB); Shaun McGinnity, Belfast (GB)

(73) Assignee: Openwave Mobility Inc., Redwood City, CA (US)

( * ) Notice: Subject to any disclaimer, the term of this patent is extended or adjusted under 35 U.S.C. 154(b) by 172 days.

(21) Appl. No.: 15/260,161

(22) Filed: Sep. 8, 2016

(65) Prior Publication Data

US 2017/0078451 A1    Mar. 16, 2017

(30) Foreign Application Priority Data

Sep. 10, 2015 (GB) .................................. 1516070.8

(51) Int. Cl.
*H04L 12/851* (2013.01)
(52) U.S. Cl.
CPC ................................ *H04L 47/2441* (2013.01)
(58) Field of Classification Search
CPC .................................................. H04L 47/2441
See application file for complete search history.

(56) References Cited

U.S. PATENT DOCUMENTS

| 7,664,048 B1 | 2/2010 | Yung et al. |
| 8,948,013 B1 | 2/2015 | Janarthanan et al. |
| 9,374,404 B2 * | 6/2016 | Strasman ............ H04L 65/4084 |
| 2006/0133377 A1 | 6/2006 | Jain |
| 2007/0058561 A1 | 3/2007 | Virgile |
| 2012/0281536 A1 | 11/2012 | Gell et al. |
| 2014/0321290 A1 | 10/2014 | Jin et al. |
| 2015/0012707 A1 * | 1/2015 | Li ........................... H04L 67/34 |
| | | 711/122 |
| 2015/0381690 A1 * | 12/2015 | Schmidt .............. H04L 65/4069 |
| | | 709/231 |

(Continued)

OTHER PUBLICATIONS

Akhshabi, et al.: An Experimental Evaluation of Rate-Adaptation Algorithms in Adaptive Streaming over HTTP; MMSys'11, Feb. 23-25, 2011, San Jose, California, 12 pages.

(Continued)

*Primary Examiner* — Michael A Keller
(74) *Attorney, Agent, or Firm* — EIP US LLP

(57) ABSTRACT

A method for categorizing a downloading of a resource to a user device from a resource server in a data network is provided. Data of one or more Layer 7 protocol requests from the client device is received at an intermediate server in the data network. The intermediate server forwards the data of each of the one or more Layer 7 protocol requests to the resource server and receives data of one or more Layer 7 protocol responses from the resource server, each Layer 7 protocol response corresponding to a respective one of the Layer 7 protocol requests. The intermediate server categorizes the downloading of the resource to the client device as being one of one or more pre-defined download categories, based on a count of the one or more Layer 7 protocol responses and the determined sizes or estimated sizes of the one or more Layer 7 protocol responses.

17 Claims, 8 Drawing Sheets

(56) References Cited

U.S. PATENT DOCUMENTS

2016/0065995 A1* 3/2016 Phillips ................ H04N 21/238
725/62

OTHER PUBLICATIONS

Nelson, Dave: "Windows Media Server or Web Server?" The Official Microsoft IIS Site, May 15, 2008.

Lin Y-D et al: "Application classification using packet size distribution and port association", Journal of Network and Computerapplications, Academic Press, New York,NY, US, vol . 32, No. 5, Sep. 1, 2009.

Manuel Crotti et al: "Traffic classification through simple statistical fingerprinting", Computer Communication Review, ACM, New York, NY, US, vol. 37, No. 1, Jan. 22, 2007.

* cited by examiner

METHOD AND APPARATUS FOR CATEGORIZING A DOWNLOAD OF A RESOURCE

CROSS-REFERENCE TO RELATED APPLICATIONS

This application claims the benefit under 35 U.S.C. § 119(a) and 37 CFR § 1.55 to UK patent application no. 1516070.8, filed on Sep. 10, 2015, the entire content of which is incorporated herein by reference.

BACKGROUND OF THE INVENTION

Field of the Invention

The present invention relates to a method of categorizing a download of a resource. More particularly, the invention relates to a method of categorizing a download of a resource to a user device in a data network.

Description of the Related Technology

Application layer protocols (commonly referred to as Layer 7 protocols in the Open Systems Interconnection model (OSI Model)) are used to exchange data between processes (i.e. applications) running on different devices on a data network, for example the Internet. A typical Application layer protocol will specify what request a first process running on a first device may send to a second process running on a second device over a data network and what response the second process may send back in return. There are many well-known Application layer protocols including the HyperText Transfer Protocol (HTTP), the File Transfer Protocol (FTP) and the Real Time Streaming Protocol (RTSP).

Transport layer protocols (commonly referred to as Layer 4 protocols in the OSI Model) are used to establish data transfer channels between processes running on devices on a data network and to manage (e.g. provide reliability, flow control and multiplexing) of the data exchanged between those processes. There are many well-known Transport layer protocols including the Transmission Control Protocol (TCP) and the User Datagram Protocol (UDP).

Application layer protocols and Transport layer protocols are designed within the framework of a Protocol Suite (e.g. the TCP/IP suite) used for communications over a data network. A Transport layer protocol is first used to establish a channel or connection between two processes running on two different devices and an Application layer protocol is then used to exchange messages between the two processes.

Typically, an Application layer protocol functions as a request-response protocol in a client-server model. A first application running on a first device may be the client and a second application running on a second device may be the server. The client submits a request message to the server and the server returns content to the client in a response message.

A Transport layer protocol accepts data from the Application layer protocol (note that there may be further layers between the two) that is running over it, divides that data into chunks and adds a Transport layer header to each chunk to create a Transport layer packet. Each Transport layer packet is then encapsulated in a Network layer (commonly referred to as Layer 3) protocol packet and transmitted from the sender to the receiver. At the receiver, the Transport layer protocol receives the payload of each Network layer protocol packet, removes the Transport layer header, reassembles the chunks into the data and passes that data to the Application layer protocol running above it.

The term 'proxy server' is often used to refer to an intermediate device or server that acts to arbitrate communications between devices on a network. For example, a proxy server may act as an intermediary for requests received from a client device and addressed to a remote origin server, such as a video server, or other type of content-serving server. Such requests are typically requests for resources (e.g. Web pages, multimedia files including video files, apps etc.) or services which are stored or accessed via the remote server.

For several reasons (for example, access control, content enrichment, network management or analytics) it may be advantageous for a proxy server to be able to characterize the nature of a download occurring through it between a client device and a server (i.e. to identify the nature of the data being downloaded i.e. whether it is a web page, or an adaptive bit rate video stream or an app etc.).

Many connections between a client device and a server are secure so that the Layer 7 messages exchanged between the two are encrypted. A proxy server is incapable of decrypting the messages and therefore cannot inspect the headers or content of the Layer 7 messages (e.g. a HTTP message header). This makes it difficult for a proxy server to characterize an encrypted download between a server and a client. Even if a connection is a non-secure one it is inconvenient for a proxy server to characterize a download based on the inspection of Layer 7 message headers because this requires the proxy server having to reassembly the Layer 7 messages from the Layer 4 packets that make them up and this might not always be desirable to do. In some instances, it may not be possible to determine or infer the nature of a download based on information obtained from Layer 7 message headers.

SUMMARY

According to a first aspect of the present invention, there is provided a method for categorizing a downloading of a resource to a user device from a resource server in a data network, the method comprising: receiving, at an intermediate network device in the data network, data of one or more requests from the user device, wherein each of the one or more requests is a request for a different portion of, or the whole of, the resource to be downloaded to the user device; forwarding the data of each of the one or more requests from the intermediate network device to the resource server; receiving, at the intermediate network device, data of one or more responses from the resource server, each response corresponding to a respective one of the requests; determining, at the intermediate network device, a size of, or an estimate of the size of, each of the one or more responses; categorizing, at the intermediate network device, the downloading of the resource to the user device as being one of one or more pre-defined download categories, wherein the categorizing is based on a count of the one or more responses and the determined sizes or estimated sizes of the one or more responses.

According to a second aspect of the present, there is also provided an apparatus for an intermediate network device, the apparatus comprising: at least one processor; and at least one memory including computer program code; the at least one memory and the computer program code being configured to with the at least one processor, cause the apparatus at least to perform the steps of: receiving, at an intermediate network device in the data network, data of one or more requests from the user device, wherein each of the one or more requests is a request for a different portion of, or the whole of, the resource to be downloaded to the user device; forwarding the data of each of the one or more requests from the intermediate network device to the resource server; receiving, at the intermediate network device, data of one or more responses from the resource server, each response corresponding to a respective one of the requests; determining, at the intermediate network device, a size of, or an estimate of the size of, each of the one or more responses; categorizing, at the intermediate network device, the downloading of the resource to the client device as being one of one or more pre-defined download categories, wherein the categorizing is based on a count of the one or more responses and the determined sizes or estimated sizes of the one or more responses.

According to a third aspect of the present invention, there is also provided a non-transitory computer readable storage medium comprising a set of computer readable instructions, which, when executed by a processing system causes the system to implement at least the steps of: receiving, at an intermediate network device in the data network, data of one or more requests from the user device, wherein each of the one or more requests is a request for a different portion of, or the whole of, the resource to be downloaded to the user device; forwarding the data of each of the one or more requests from the intermediate network device to the resource server; receiving, at the intermediate network device, data of one or more responses from the resource server, each response corresponding to a respective one of the requests; determining, at the intermediate network device, a size of, or an estimate of the size of, each of the one or more responses; categorizing, at the intermediate network device, the downloading of the resource to the client device as being one of one or more pre-defined download categories, wherein the categorizing is based on a count of the one or more responses and the determined sizes or estimated sizes of the one or more responses.

Advantageously, this approach allows the intermediate network device to be able to categorize the download without having to inspect the headers of the requests or responses for information identifying the nature of the download, which may not even be possible if the requests or the responses are encrypted.

BRIEF DESCRIPTION OF THE DRAWINGS

Further features and advantages of the invention will become apparent from the following description of embodiments of the invention, given by way of example only, which is made with reference to the accompanying drawings.

Several parts or components appear in more than one of the above Figures and for clarity the same reference numeral is used to refer to the same part or component in all of the Figures.

DETAILED DESCRIPTION OF CERTAIN INVENTIVE EMBODIMENTS

Figure 1:
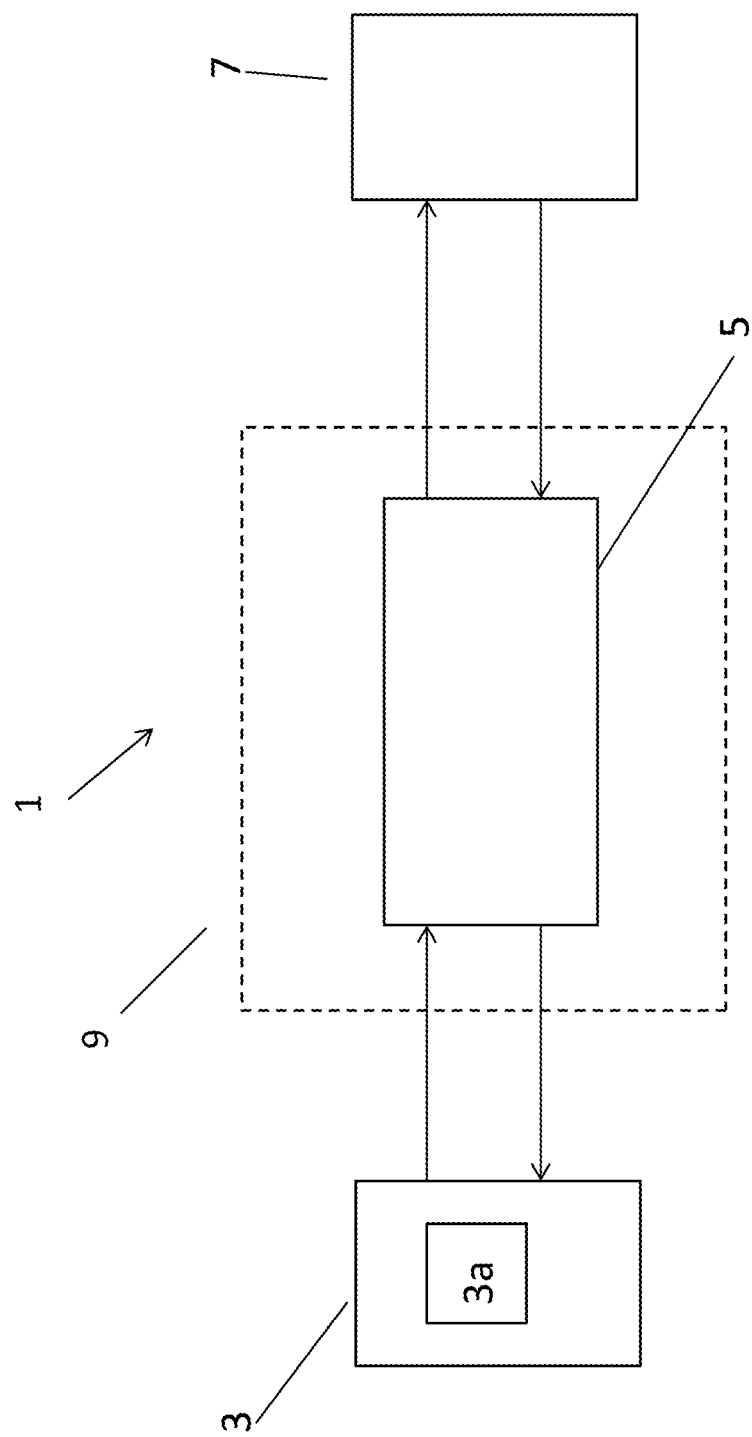
FIG. 1 is a schematic diagram of a system comprising a proxy server in accordance with an embodiment of the invention.

Embodiments of the invention utilise an intermediate server to categorise the downloading of a resource to a user device from a resource server in a data network. The proxy server receives data of one or more Layer 7 protocol requests from the client device, each of which is a request for a different portion of (or, in the case of a single request, the whole of) the resource to be downloaded to the client device. The intermediate server forwards the data of each Layer 7 protocol request to the resource server. The intermediate server receives data of a Layer 7 response for each request and determines for each Layer 7 response the size of or an estimate of the size of that response. The intermediate sever categorises the downloading of the resource to the client device as one of one or more of pre-defined download categories based on a count of the one or more Layer 7 protocol responses and the determined data sizes or estimates of the data sizes of the Layer 7 protocol responses.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

FIG. 1 depicts a data network 1 in accordance with an embodiment of the invention. As described in more detail below, the data network 1 includes a user device 3, an intermediate network device 5, and an origin server 7. Although FIG. 1 is described with respect to one client device, one intermediate network device and one origin server, the description is not limited to a single client device, intermediate network device, and origin server.

In this example, the user device 3 is a client device and may be any networked device including, without limitation, a mobile phone, a smart phone, a personal digital assistant (PDA), a tablet, a set-top box, a video player, a laptop, or a personal computer (PC). In one embodiment, the client device 3 is a wireless device that can support at least one of various different radio frequency (RF) communications protocols, including without limitation, Global System for Mobile communications (GSM), Universal Mobile Telecommunications System (UMTS), Code Division Multiple Access (CDMA), Worldwide Interoperability for Microwave Access (WiMax) and communications protocols as defined by the $3^{rd}$ Generation Partnership Project (3GPP) or the $3^{rd}$ Generation Partnership Project 2 (3GPP2), 4G Long Term Evolution (LTE) and IEEE 802.16 standards bodies.

Although some wireless communications protocols are identified herein, it should be understood that the present disclosure is not limited to the cited wireless communications protocols. In another embodiment, the client device 3 is a wired device that communicates with the intermediate network device 5 through a communication interface, such as analog modem, ISDN modem or terminal adapter, DSL modem, cable modem, Ethernet/IEEE 802.3 interface, or a combination thereof. In another embodiment, the client device 3 is connected to the intermediate network device 5 via a combination of wireless and wired communication interfaces.

The client device 3 runs a client application 3a for requesting resources from the origin server 7. The client application 3a may for example be a web browser for requesting web pages from the origin server 7 if the origin server 7 is a web page 7, an adaptive bit rate (ABR) video streaming player for requesting an ABR video stream from the origin server 7 if the origin server 7 is an ABR video stream server, or an app store app (e.g. Apple's® app store app or Google's® Google play app) for requesting an app from the origin server 7 if the origin server 7 is an app store or indeed any suitable application for requesting content from an origin server.

In this example, the intermediate network device 5 is a proxy server 5 in the data communications path between the client device 5 and the origin server 7 and is implemented in, for example, a gateway server. In one embodiment, the proxy server 5 is a transparent proxy server that passes requests and responses (e.g., HTTP requests and responses) between client devices such as the client device 3 and host servers such as the origin server 7 without modifying the requests and responses. A proxy server 5 that simply passes requests and responses is often referred to as a gateway or a tunneling proxy. In another embodiment, the proxy server 5 is a non-transparent proxy that can modify requests and responses between client devices and host servers in order to provide additional services. For example, a non-transparent proxy may provide media caching services, group annotation services, media type transformation services, or protocol reduction services.

In one embodiment, the proxy server 5 is part of a wireless service provider network and the client device 3 is a wireless device, such as a mobile phone, that is a recognized/authorized subscriber to the wireless service provider network.

In one embodiment, the proxy server 5 is part of an access network 9, which provides a communications interface for the client device 3 to access the Internet or an intranet. Typical access networks include wireless service provider networks (e.g., that offer 3G, 4G and/or WiFi access) and Internet Service Providers (ISPs, e.g., that offer dial-up, DSL, and cable modem access). A private enterprise network can also serve as the access network if client devices within the private enterprise network can access the Internet through the private enterprise network. In one embodiment, the access network 9 is a wireless service provider network that provides a wireless communications interface for the client device. The wireless service provider network is accessible on a subscription basis (e.g., prepaid or post-paid) as is known in the field.

In an embodiment, the wireless service provider network is a closed domain that is accessible only by a subscriber (e.g. a user of the user device) that is in good standing with the operator of the wireless service provider network. The wireless service provider network may include a radio access network (not shown) and an Internet gateway (not shown). The radio access network includes one or more base stations to facilitate communications among wireless devices that are within a communication range of the base stations. Each base station has at least one RF transceiver and the base stations communicate with the wireless devices using RF communication signals. The radio access network facilitates network communications among multiple wireless devices within the same wireless service provider network and between wireless devices in other wireless service provider networks and provides interfaces to facilitate communications with other entities, such as a Public Switched Telephone Network (PSTN), a Wide Area Network (WAN), the Internet, Internet servers, hosts, etc., which are outside of the wireless service provider network. In an embodiment, the wireless service provider network is operated by a single wireless service provider, such as, for example, AT&T, VERIZON, T-MOBILE, and SPRINT. The Internet gateway (not shown) of the access network provides a gateway for communications between the client device 3 and Internet-connected hosts and/or servers, which can also be referred to as the "cloud." The Internet gateway may include a Serving General Packet Radio Service (GPRS) Support Node (SGSN) and a Gateway GPRS Support Node (GGSN).

The origin server 7 can be any device or system that hosts digital resources, which can be stored in various formats, such as video files, audio files, and/or text files, apps etc. In one embodiment, the origin server 7 is an Internet-connected host or server that hosts Internet accessible content elements. The origin server 7 may be a server that can be accessed via, for example, Layer 7 protocols such as HTTP, Internet Message Access Protocol (IMAP), or File Transfer Protocol (FTP). A content element is any set of digital data suitable for transfer in a networked environment, such as video files, markup language files, scripting language files, music files, image files or any other type of element that can be located and addressed through, for example, the Internet.

Figure 2:
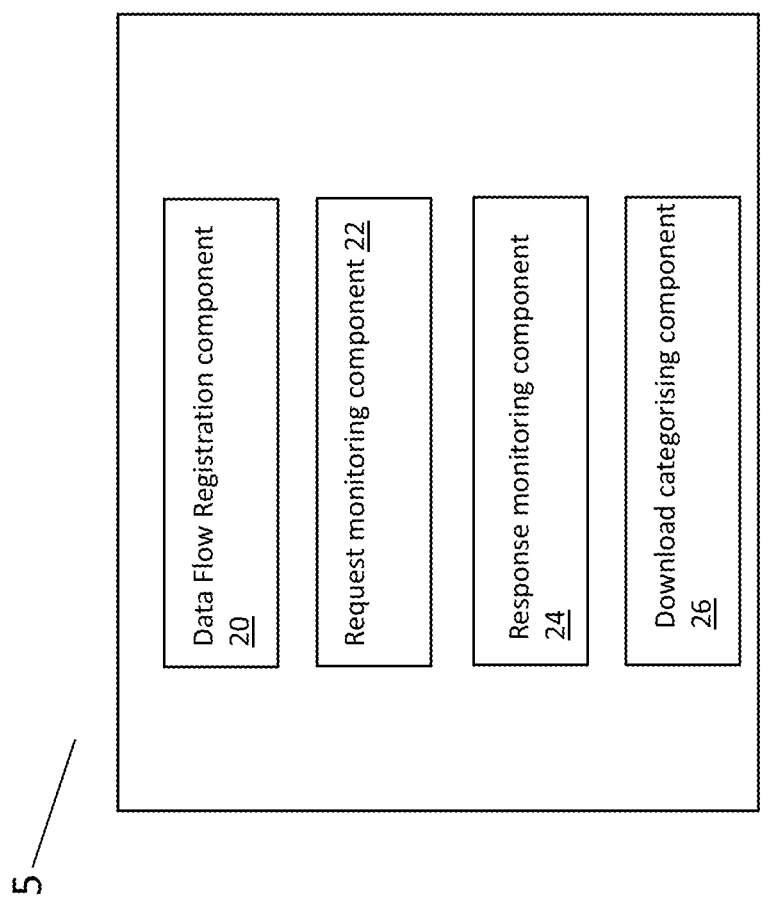
FIG. 2 is a schematic diagram of a proxy server in accordance with an embodiment of the invention.

Referring now to FIG. 2, the proxy server 5 may comprise a data flow registration component 20, a request monitoring component 22, a response monitoring component 24 and a download categorising component 26.

The data flow registration component 20 is configured to detect and register a data flow between the client device 3 and the origin server 7. In this context, a data flow is associated with an 'end-to-end' exchange of data between the client device 3 and the origin server 7. This exchange of data is performed using an Application Layer (Layer 7) protocol (e.g. HTTP or HTTPS) and a Transport Layer Protocol (Layer 4) (e.g. TCP or UDP). Accordingly, a data flow may be defined as the flow of data between a client side endpoint at the client device 3 and a server side end-point at the origin server 7. The client side end point may be a client socket (e.g. a transport layer socket such as a TCP socket) defined by a client IP address and client port number and likewise the server side end point a server socket (e.g. a transport layer socket such as a TCP socket) defined by a server IP address and server port number. The data flow is thus identifiable by virtue of the 4-tuple comprising: client IP address, client port number, origin server IP address, origin server port number contained in the headers of packets of the data flow.

A data flow may comprise a number or requests sent from the client device 3, for the client application 3a, to the origin server 7 using a Layer 7 protocol and a corresponding number of Layer 7 responses sent form the origin server 7 to the client device 3 in reply. The request monitoring component 22 monitors for and keeps a record of each Layer 7 request message sent from the client device 3 to the origin server 7 for a given data flow. The response monitoring component 24 monitors each Layer 7 response message to a given Layer 7 request message, correlates it with its associated Layer 7 request message, and determines the data size of that Layer 7 response message.

The download categorising component 26 categorises a data download from the origin server 7 to the client device 3 for a given flow based on a number of request messages associated with the download monitored by the request monitoring component 22 and the size of the received responses.

In one example, a download may be categorised as one of (a) a web page download, (b) an ABR video streaming download or (c) a large single file download.

Each of these types of download will now be briefly described.

Web Page Download

As is very well known, a web browser is an application that is used to display web pages on a monitor of a client computing device. A typical web page is rendered by a web browser using multiple components or portions of that web page including a web document (i.e. a computer file) usually written in the mark-up language HTML (or other such similar mark-up language) that defines the web page and includes text to be displayed on the web page. A web document typically specifies links to one or more other portions of the web page that are required by the web browser to render the web page and which are stored in separate files to the web document itself, either on the same server as the one that stores the web document or on a different server or servers. These portions can include (but are not limited to):

(a) Cascading Style Sheet (CSS) instructions which provide layout, typographic and colour scheme information to a browser;

(b) Scripts—usually written in Javascript and which provide interactivity and functionality;

(c) Static images which are typically provided as GIF, JPEG or PNG files;

(d) Video files;

(d) Audio files.

A web browser will request a web document from a server (typically in response to a user inputting a URL or clicking on a link to that web document) by sending a HTTP request for the web document and will receive the web document in a HTTP response. The web browser will then process the received document and send a separate request for each additional component referenced in the web document. Once a response for each additional component has been received by the browser, the browser can fully render the web page.

Accordingly, in order to render a web page as a resource, a web browser will send multiple HTTP requests for the components or portions that make up that web page and receive multiple HTTP responses containing those portions.

Notwithstanding the fact that one or more of those portions might be a relatively large video file, many web pages comprises one or more scripts, a stylesheet and multiple images. Files of this nature tend to have a data size in the range of 500 bytes to 50 Kbytes. Accordingly, multiple Layer 7 requests and corresponding Layer 7 responses that each has a data size within range of 500 bytes to 50 Kbytes is therefore a characteristic of a typical 'web page download'.

Adaptive Bit Rate (ABR) Streaming

ABR streamlining, for example, Hyper Text Transfer Protocol (HTTP) Adaptive Video Streaming (AVS) is a known technique used to stream video content over the Internet and other communications networks. In order to support ABR streaming, typically, a video server, in a communication network, makes available for download multiple versions or streams of the same video content, each version having one or more characteristics associated therewith that are different to those of the other versions. For example, the one or more characteristics may relate to video quality, as indicated, for example, by the playback bit rate of the video, or resolution (e.g. 1080p, 720p, etc).

Each version is sub divided into a plurality of consecutive smaller multi-seconds parts known as segments or chunks. Each segment is typically between 2 to 10 seconds of duration. The video server also makes available a so called manifest file which contains information (e.g. meta-data) describing each and every available segment which is to be used by a client device in order to play back segments. A manifest file also contains a different pointer to or an address (typically a Uniform Resource Locator (URL)) for each segment of each version of the video content, or alternatively, a different pointer to or an address (again typically a URL) for each version of the video content and a byte range for each different segment within each version. This segment pointer information enables a client device to individually request segments from the server.

Prior to downloading desired video content from the video server, a player application on a client device first downloads the manifest file for that video content and uses the manifest file to identify the different available versions of the video content. Based on the information in the manifest file, the client sends sequential HTTP requests for segments of the video content, the segments being those that have a quality level, as indicated by playback bit rate or resolution, most appropriate for the download bandwidth currently available to the client device. Typically, in HTTP adaptive streaming, a HTTP GET request will only be issued by a client device for the next segment in the sequent when the complete previous segment has been received.

The client device continuously monitors the available download bandwidth and if it finds that the bandwidth has deteriorated to an extent that it is now too low for the quality level of the segments currently being downloaded, the client device starts to request the next segments for displaying the video content from a lower quality level (e.g. lower playback bit rate or resolution) if available.

Conversely, if it finds that the bandwidth has improved to an extent that it can accommodate higher quality segments than those segments currently being downloaded, the client device starts to request the next segments for displaying the video content from a higher quality stream (if available).

Accordingly, ABR streaming enables a user device to dynamically select the best available stream according to network throughput. Requesting segments one after the other at possibly different resolutions can result in a smoother video experience for a user even if the available bandwidth varies.

Current proprietary implementations of ABR streaming include Microsoft's 'Smooth Streaming' implemented by its Silverlight player, Apple's 'HTTP Adaptive BitRate Streaming' implemented in its desktop and mobile products, and Adobe's 'HTTP Dynamic Streaming' implemented by its Flash player (v10.1 and later). All three of these implementations support H.264 as a video codec and Advanced Audio Coding (AAC) as an audio codec.

In addition, the standards body 3GPP has defined its standard 'Dynamic Adaptive Streaming over HTTP' and the standards body MPEG its standard 'Dynamic Adaptive HTTP Streaming'.

The data size of a typical segment will vary from between 102401 bytes for a short (e.g. 2 s) 'low quality' segment to 5 Mbytes value for a long (e.g. 10 s) 'high quality' segment. A video rendering app will send a request for each segment (i.e. portion) that makes up a video file and hence, typically, will need to send multiple HTTP requests and receive multiple HTTP responses containing those segments in order to render a video resource using ABR streaming. For example, assuming that a segment contains 10 s of video playback time, six requests will have to be sent for each minute of video to be played. Accordingly, multiple requests and corresponding responses each having a data size within the range 102401 bytes to 5 Mbytes is therefore a characteristic of a typical 'ABR streaming' download of a resource.

Large Single File Download

Many client device requests for relatively large objects stored on a remote server involve the client device sending only a small number of requests to the server for the object and receiving the object in a small number of relatively large responses from the server.

A first example is that of a request sent from a client device for an app stored at an app store. Android Application Package (APK) is the package file format used to distribute and install apps onto user devices that use Google's® Android operating system. APK files are in ZIP format and are requested by a user device via a single HTTPs request and are delivered using a single HTTPS response. Similarly, an .ipa file is an iOS application archive file which stores an iOS app which generally can only be installed on Apple's® iOS devices. .ipa files are also requested by a user device via a single HTTPs request and are delivered using a single HTTPS response. Such app files tend to be larger than 1,000,000 bytes A second example is that of a request for a video file to be downloaded as a single file from a video store. A typical HD feature film length video file is typically larger than 20 Mbytes.

In order to obtain a single large file of this nature, an application will send a single request for the whole portion of that file and receive a single response containing that file.

Accordingly, a single request and a corresponding response containing a large amount of data is therefore a characteristic of a typical 'large single file download' of a resource.

Examples of an Embodiment of the Invention

Following on from the discussion above, it will be appreciated therefore that in general:

(i) a web page download may be characterised by a relatively large number of Layer 7 requests (e.g. one for a HTML document and one for each further component referenced in the HTML document) and a corresponding number of Layer 7 responses that are relatively small in data size;

(ii) an ABR streaming download may be characterised by a relatively large number of Layer 7 requests (e.g. each one for a different segment of the video file) and a corresponding number of Layer 7 responses that are relatively large in data size; and (iii) a large single file download may be characterised by a relatively small number of Layer 7 requests and a corresponding number of Layer 7 responses that are very large in data size Based on this insight, in one example, the proxy server 5 categorises a download in accordance with the criteria set out in Table A below.

TABLE A

| Download Category | Lower bound of Required Number of Consecutive Requests/Responses | Upper bound of Required Number of Consecutive Requests/Responses | Lower bound of data size of Layer 7 Response (bytes) | Upper bound of data size of Layer 7 Response (bytes) |
|---|---|---|---|---|
| Web Page | 3 | No upper limit | 0 | 102400 |
| Streaming | 3 | No upper limit | 102401 | 5242880 |
| Single File Download | 1 | 1 | 1048577 | No limit |

Accordingly, if for a given data flow between the client device 3 and the origin server 7 the response monitoring component 24 identifies or infers:

(a) 3 consecutive Layer 7 responses each of which has a data size within the range 0 to 102400 bytes, the download categorizing component 26 categorizes the download as being a web page download;

(b) 3 consecutive Layer 7 responses each of which has a data size within the range 102401 to 5242880 bytes, the download categorizing component 26 categorizes the download as being an adaptive video streaming download;

(c) 1 (and only 1) consecutive Layer 7 response which has a data size greater than 1048577 bytes, the download categorizing component 26 categorizes the download as being a large single file download If for a given data flow between the client device 3 and the origin server 7, the response monitoring component 24 does not identify any of (a) to (c), the data flow is not categorized.

It will be appreciated that the above described response patterns are examples only and other different response patterns might be used to categorize a download. For example, the pattern x out of y consecutive responses (e.g. 5 out of 7) in the range of 102401 to 5242880 Bytes may be used to categorize the dataflow as an ABR dataflow or in the range of 0 to 102400 bytes as being a web page download.

It will be appreciated that the data range sizes are also examples only.

In some examples, the reception of a plurality of request/responses at regular time intervals may be used categorize the download an ABR streaming download.

Each of the examples (a) to (c) will now be described in more detail with respect to FIGS. 3 to 5.

Example 1—Characterizing a Web Page Download

Figure 3:
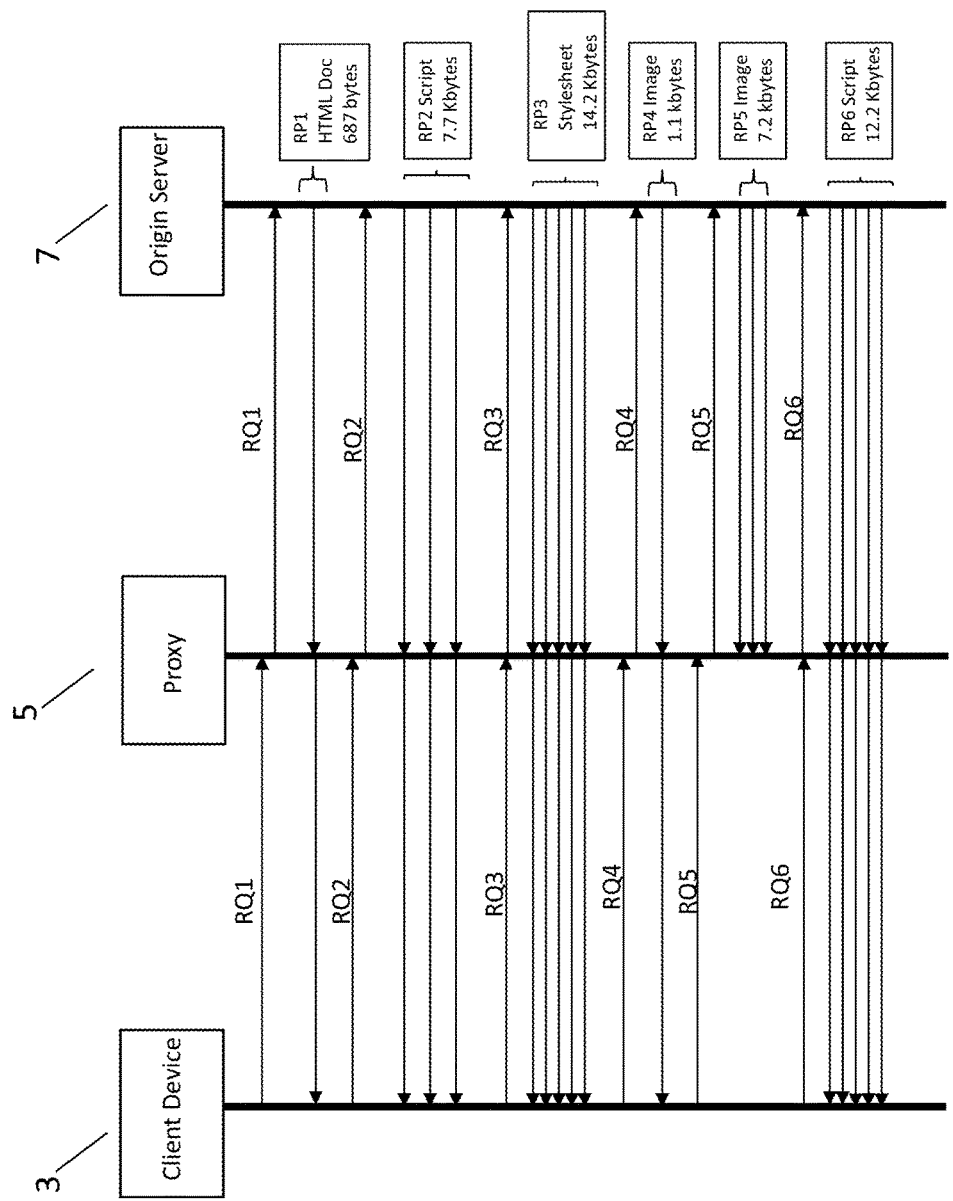
FIG. 3 is a signaling diagram showing an exchange of messages in accordance with a first example of characterizing a download in accordance with an embodiment of the invention.

FIG. 3 shows the flow of data through the proxy server 5 when the client device 3 downloads a web page from the origin server 7. In this example, the client application 3a is a web browser. The client device 3 sends a first HTTP request RQ 1 for a HTML document stored at the origin server 7. The data of the first HTTP request RQ1 is received by the proxy server 5 and the proxy server 5 forwards the first HTTP request RQ1 to the origin server 7. In response to receiving the first HTTP request RQ1, the origin server 7 sends a first HTTP response RP1 which comprises a HTML document. The first HTTP response RP1 comprises 687 bytes of data and is transmitted through the network encapsulated in a single TCP/IP packet as indicated in FIG. 3 by the use of a single arrow. The proxy server 5 receives the data of the first HTTP response RP1 and forwards it to the client device 3.

The client device 3 receives the first HTTP response RP1, processes it and then sends five further HTTP requests RQ2 to RQ6 to the origin sever 7 each one of the five further HTTP requests RQ2 to RQ6 being for a component of the web page referenced in the HTML document. The data of each of the five further HTTP requests RQ2 to RQ6 is received by the proxy server 5 and is forwarded by the proxy server 5 to the origin server 7. In response to receiving each one of the further HTTP requests RQ2 to RQ6, the origin server 7 sends a respective further HTTP response RP2 to RP6 which includes the component requested by the request corresponding to that response.

In this example, the second HTTP response RP2 includes a script, comprises 7.7 kbytes of data and is transmitted through the network encapsulated in a small number (for example 3) TCP/IP packets (as represented in FIG. 3 by the use of three arrows); the third HTTP response RP3 includes a Stylesheet, comprises 14.2 kbytes of data and is transmitted through the network encapsulated in a number (for example five) TCP/IP packets (as represented in FIG. 3 by the use of five arrows); the fourth HTTP response RP4 includes an image, comprises 1.1 kbytes of data and is transmitted through the network encapsulated in a single TCP/IP packet (as represented in FIG. 3 by the use of a single arrow); the fifth HTTP response RP5 includes an image, comprises 7.2 kbytes of data and is transmitted through the network encapsulated in a number (for example three) TCP/IP packets (as represented in FIG. 3 by the use of three arrows); and the sixth HTTP response RP6 includes a script, comprises 12.2 kbytes of data and is transmitted through the network encapsulated in a number (for example five) TCP/IP packets (as represented in FIG. 3 by the use of five arrows).

The proxy server 5 receives the data of each of the further HTTP responses RP2 to RP6 and forwards the data of each of them to the client device 3.

In this example, for each HTTP response, the proxy 5 monitors, at the Transport Layer (Layer 4) the data flowing through the proxy 5 and determines the data size of the payload of the Layer 4 data. It will be appreciated that because a Layer 7 response is conveyed as payload at Layer 4, a measurement of Layer 4 payload data size will give the size of the Layer 7 response being conveyed (either exactly if the Layer 4 payload only comprises Layer 7 data, or approximately if the Layer 4 payload is also carrying over head from other Layers between Layer 4 and Layer 7 e.g. Layer 5 overhead).

In this first example, because three consecutive responses are received that in respect of each there is a TCP payload data size (i.e. a Layer 4 payload data size) in the range 0b to 50 kbytes, the download is classified as a Web page download.

Second Example—Characterizing an ABR Streaming Download

Figure 4:
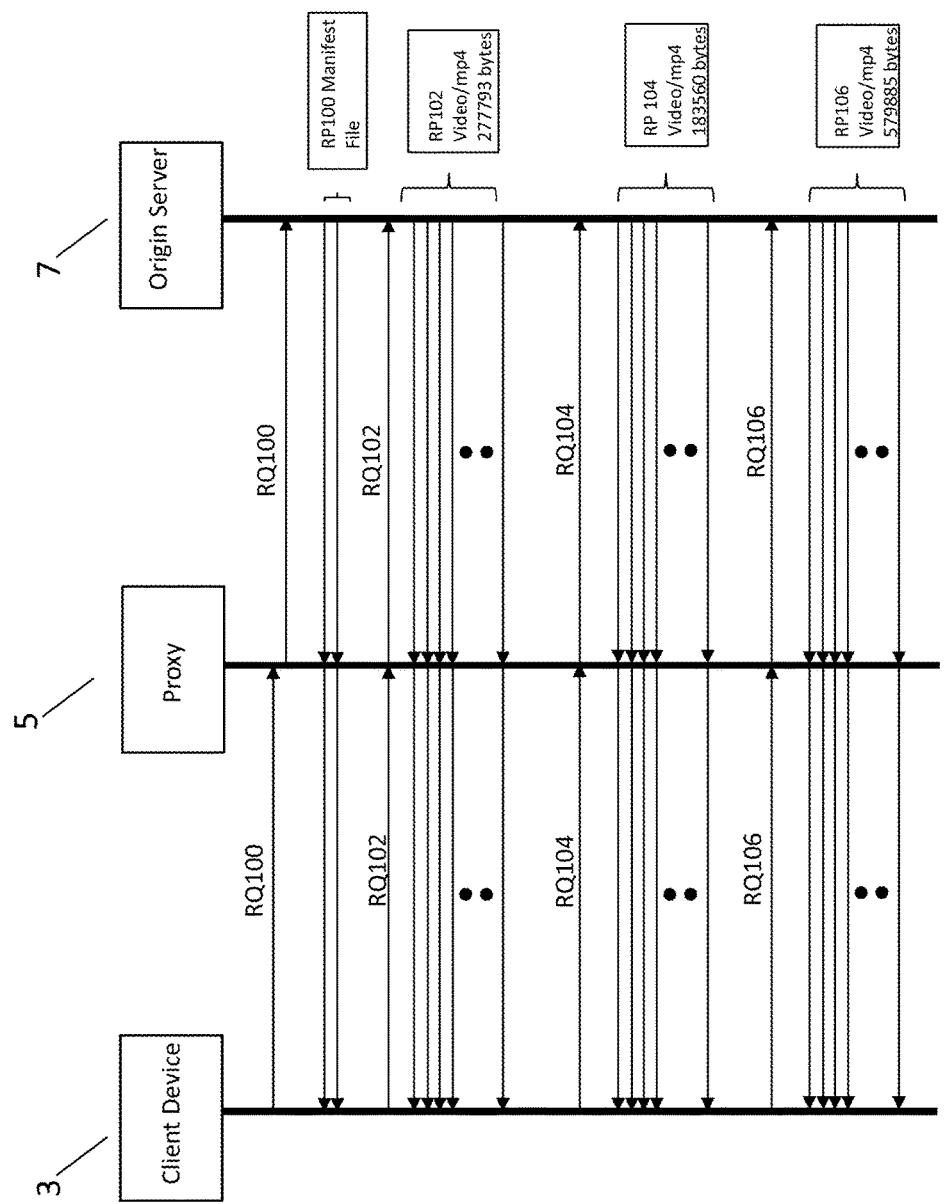
FIG. 4 is a signaling diagram showing an exchange of messages in accordance with a second example of characterizing a download in accordance with an embodiment of the invention.

FIG. 4 shows a flow of data through the proxy server 5 when the client device 3 downloads a video file from the origin server 7 using HTTP adaptive bitrate streaming. In this example, the client application 3a is a dedicated video rendering application.

The client device 3 sends a first HTTP request RQ100 to the origin server 7 to initiate the downloading of the video file. The data of the first HTTP request RQ100 is received by the proxy server 5 and the proxy server 5 forwards the data of the first HTTP request RQ100 to the origin server 7. In response to receiving the first HTTP request RQ100, the origin server 7 sends a first HTTP response RP100 which comprises a manifest file for the video file. The first HTTP response RP100 is relatively small and is transmitted through the network encapsulated in two TCP/IP packets as indicated in FIG. 4 by the use of two arrows. The proxy server 5 receives the data of first HTTP response RP100 and forwards it to the client device 3.

The client device 3 receives the first HTTP response RP100, processes it and then sends a second HTTP request RQ102 to the origin sever 7 for a first segment of the video file. The proxy server 5 receives and forwards the data of the second HTTP request RQ102 to the origin server 7. In response to receiving the second HTTP request RQ102, the origin server 7 sends a respective second HTTP response RP102 which includes the first video segment requested by the second HTTP request RQ102.

The second HTTP response RP102 comprises 277793 bytes of data and is transmitted through the network encapsulated in a relatively large number of TCP/IP packets as indicated in FIG. 4 by the use of multiple arrows and dots. The proxy server 5 receives the data of the second HTTP response RP102 and forwards it to the client device 3.

After receiving the second HTTP response RP102, the client device 3 then sends a third HTTP requests RQ104 to the origin sever 9 for a second segment of the video file. The proxy server 5 receives forwards the data of the third HTTP request RQ104 to the origin server 7. In response to receiving the third HTTP request RQ104, the origin server 7 sends a respective third HTTP response RP104 which includes the second video segment requested by the third HTTP request RQ104.

The third HTTP response RP104 comprises 183560 bytes of data and is transmitted through the network encapsulated in a relatively large number of TCP/IP packets as indicated in FIG. 4 by the use of multiple arrows and dots. The proxy server 5 receives the data of the third HTTP response RP104 and forwards it to the client device 3.

After receiving the third HTTP response RP104, the client device 3 then sends a fourth HTTP requests RQ106 to the origin sever 7 for a third segment of the video file. The proxy server 5 receives and forwards the data of the fourth HTTP request RQ106 to the origin server 7. In response to receiving the fourth HTTP request RQ106, the origin server 7 sends a respective fourth HTTP response RP106 which includes the third video segment requested by the fourth HTTP request RQ106.

The fourth HTTP response RP106 comprises 579885 bytes of data and is transmitted through the network encapsulated in a relatively large number of TCP/IP packets as indicated in FIG. 4 by the use of multiple arrows and dots. The proxy server 5 receives the data of the fourth HTTP response RP106 and forwards it to the client device 3.

In this second example, again, for each HTTP response, the proxy 5 monitors, at the Transport Layer, the data flowing through the proxy 5 determines the size (expressed as a number of bytes) of, or an estimate of the size of, the HTTP response by determining the size of the TCP payload data that the proxy 5 receives from the origin server 7 and forwards to the client application 3a. In this example, because three consecutive responses are received that in respect of each of which there is a TCP payload data size in the range 100 k to 5 Mb, the download is classified as an ABR streaming download.

It will be appreciated that in the case of ABR streaming, determining that there a plurality of responses in a data flow that are received at regular time intervals may further indicate that the download is an ABR streaming download.

Third Example—Characterizing a Large Single File Download

Figure 5:
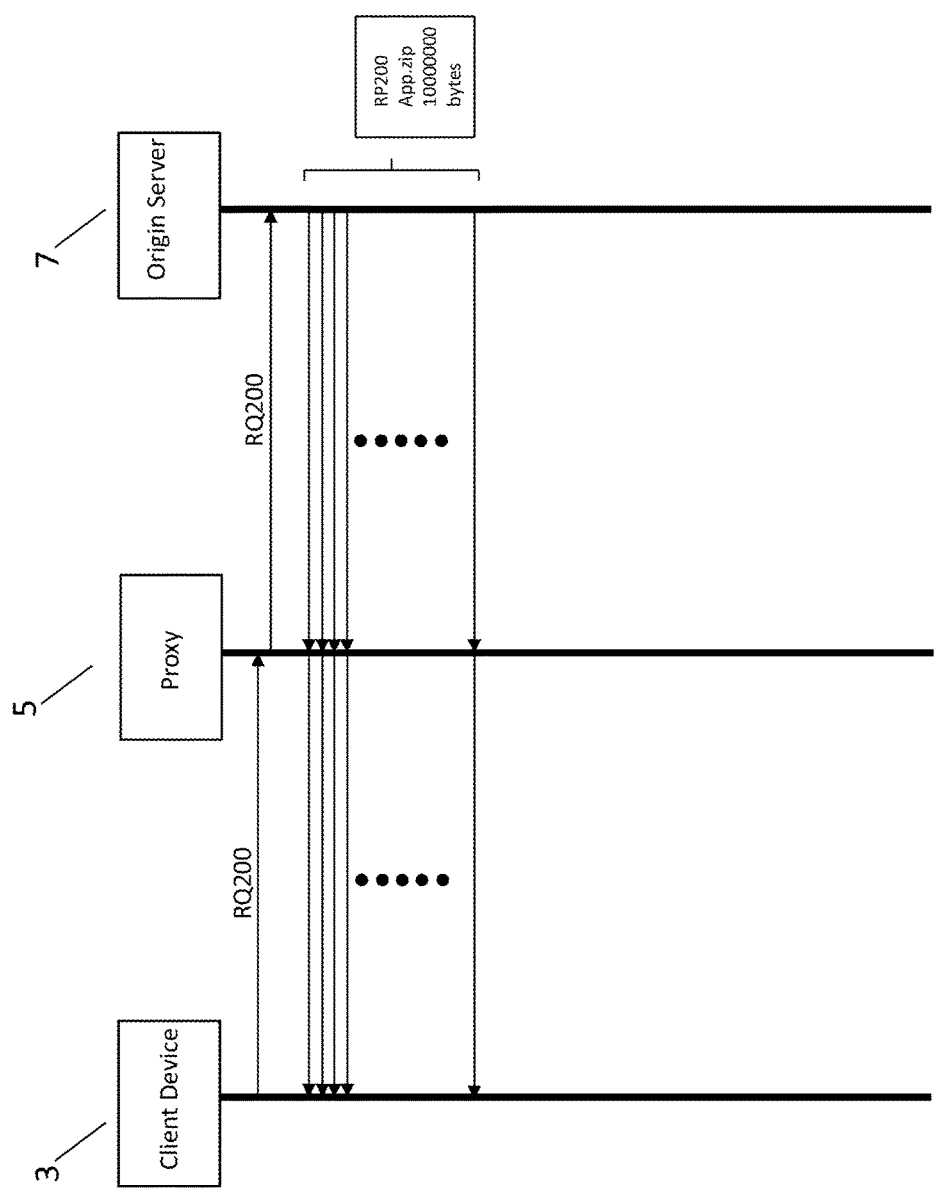
FIG. 5 is a signaling diagram showing an exchange of messages in accordance with a third example of characterizing a download in accordance with an embodiment of the invention.

FIG. 5 shows a flow of data through the proxy server 5 when the client device 3 downloads an app from the origin server 7 using HTTP.

The client device 3 sends a first HTTP request RQ200 to the origin server 7 to request the downloading of the app. The data of the first HTTP request RQ200 is received by the proxy server 5 and the proxy server 5 forwards the data of the HTTP request RQ200 to the origin server 7. In response to receiving the HTTP request RQ200, the origin server 7 sends a HTTP response RP200 which comprises an app.

The HTTP response RP200 comprises 10,000,000 bytes of data and is transmitted through the network encapsulated in a very large number of IP packets as indicated in FIG. 4 by the use of multiple arrows and dots. The proxy server 5 receives the data of the HTTP response RP200 and forwards it to the client device 3.

In this third example, again, for the HTTP response, the proxy 5 monitors, at the Transport Layer, the data flowing through the proxy server 5 and determines the size (expressed as a number of bytes) of, or an estimate of the size of, the HTTP response by determining the size of the TCP payload data that the proxy server 5 receives from the origin server 7 and forwards to the client application 3a. In this example, because a single response is received in respect of which there is a TCP payload data size that is larger than 1048577 bytes, the download is classified as a single large file download.

Determining the TCP Payload Data Size of any Given Response

Figure 6:
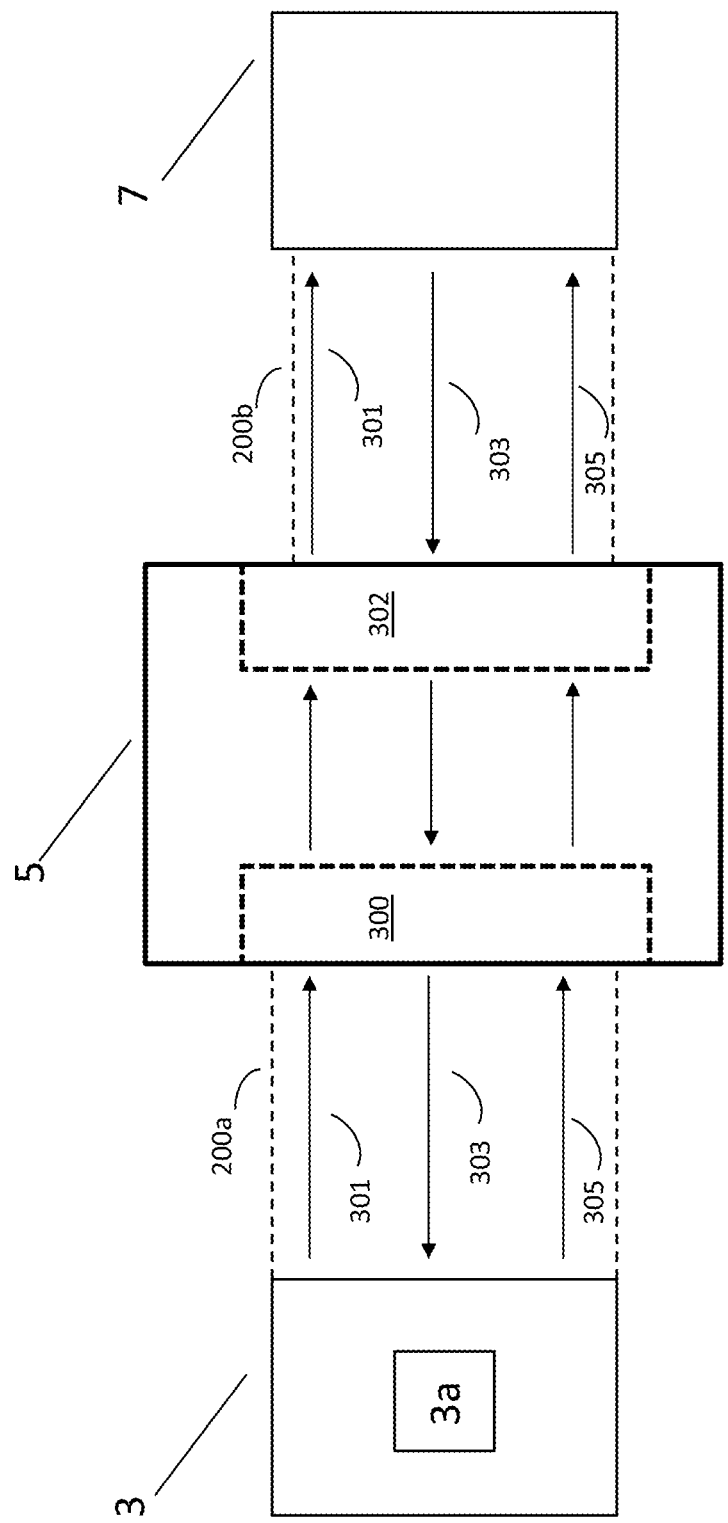
FIG. 6 is a schematic diagram of a system comprising a proxy server in accordance with an embodiment of the invention.

FIG. 6 illustrates one example of a system by which the proxy server 5 may determine the data size, or an estimate of the data size, of any given one of the HTTP responses described in the above examples by monitoring the data flowing through the proxy server 5 at Layer 4.

In this example, a split TCP connection 200a, 200b between the client device 3 and the origin server 7 comprises a first TCP connection 200a between the client device 3 and the proxy server 5 and a second TCP connection between the proxy server 5 and the origin server 7.

The first TCP connection 200a (illustrated by a pair of broken lines) between the client device 3 and the proxy server 5 is established using a standard first TCP 3-way handshake (not illustrated). The first TCP handshake comprises a SYN packet sent by the client application 3a to the origin server 17 but which is intercepted by the proxy server 5, a SYN-ACK sent from the proxy server 5 to the client application 3a in response to the SYN, and an ACK sent from the client application 3a in response to the SYN-ACK and which is also intercepted by the proxy server 5. The first TCP connection 200a comprises as its end points a client TCP socket (not illustrated) at the client device 3 and a client side TCP socket 300 at the proxy server 5.

The second TCP connection 200b (also illustrated by a pair of broken lines) between the proxy server 5 and the origin server 7 is established also using a standard second TCP 3-way handshake (not shown). The second TCP handshake comprises a SYN packet sent from the proxy server 5 to the origin server 7, a SYN-ACK sent from the origin server 7 to the proxy server 5 in response to the SYN, and an ACK sent from the proxy server 5 in response to the SYN-ACK. The second TCP connection 200b comprises as its end points a server TCP socket (not illustrated) at the origin server 7 and a server side TCP socket 302 at the proxy server 5.

In this example, after the first TCP connection 200a is established, the proxy server 5 receives, at the client side TCP socket 300, TCP payload data that makes up a first HTTP request 401 from the client application 3a. It will be appreciated that, in accordance with the TCP/IP protocol stack, the TCP payload data arrives at the proxy server 5 over the first TCP connection 200a encapsulated in one or more IP packets. The IP Layer at the proxy server 5 reassembles these one or more IP packets into TCP data (i.e. the IP Layer strips out the IP headers of the one or more IP packets) and presents this TCP data to the TCP layer at the proxy server 5. The TCP layer at the proxy server 5 strips out the TCP headers in this TCP data to provide the TCP payload data.

The proxy server 5 reads the TCP payload data from the client side TCP socket 300 and writes it to the server side TCP socket 302 for onwards transmission of the first HTTP request 401 to the origin server 7. Again, it will be appreciated that, in accordance with the TCP/IP protocol stack, the TCP layer at the proxy server 5 will add appropriate TCP headers to the TCP payload data and pass this TCP data to the IP layer at the proxy server 5 which transmits it to the origin server 7 encapsulated in one or more IP packets.

Subsequently, the proxy server 5 then receives at the server side TCP socket 302 TCP payload data that makes up a HTTP response 303 to the first HTTP request 301. Again, it will be appreciated that, in accordance with the TCP/IP protocol stack, this TCP payload data arrives at the proxy server 5 over the second TCP connection 200b encapsulated in one or more IP packets. The IP Layer at the proxy server 5 reassembles these one or more IP packets into TCP data (i.e. the IP Layer strips out the IP headers of the one or more IP packets) and presents this TCP data to the TCP layer at the proxy server 5. The TCP layer strips out the TCP headers in this TCP data to provide the TCP payload data.

The proxy server 5 reads the TCP payload data from the server side TCP socket 302 and writes it to the client side TCP socket 300 for onwards transmission of the HTTP request 401 to the origin server 7. Again, it will be appreciated that, in accordance with the TCP/IP protocol stack, the TCP layer at the proxy server 5 will add appropriate TCP headers to the TCP payload data and pass this TCP data to the IP layer at the proxy server 5 which it transmits it to the client application 3a encapsulated in one or more IP packets.

During this process, the proxy server 5 maintains a running count of the amount data (i.e. the number of Bytes) that it reads from the server side TCP socket 302 and then writes to the client side TCP socket 300. Then, at some point in time, the proxy server 5 receives at the client side TCP socket 300 TCP payload data that makes up a subsequent request HTTP 305. The reception of this data at the client side TCP socket 300 indicates to the proxy server 5 that the first HTTP response 301 has now fully passed through the proxy server 5 (because a subsequent HTTP request is not sent by the client application 3a until it receives the previous response) and hence the count of the TCP payload data that makes up the first HTTP response 301 is now complete.

This process may be repeated for multiple requests and responses, with the proxy server 5 in effect inferring that a set of TCP payload data arriving at the TCP client side socket 300 and then passing through the TCP server side socket 302 relates to a request and that all the TCP payload data that is then subsequently received at the server side TCP socket 302 before a new set of TCP payload data is received at the client side socket 300 relates to a response to that request.

In the event that just a single request is received at the client side socket 302, the proxy server 5 may infer that no further requests will be received if a timer, that is started when the response to the request has passed through the proxy server 5, expires but no further data is receive at the client side socket 302.

In the context of FIG. 2, the data flow registration component 20 registers a data flow as being that between the client socket and the server socket (via the client side TCP socket 300 and the server side TCP socket 302), the request monitoring component 22 monitors the data of the requests that is read from the client side TCP socket 300 and written to the server side TCP socket 302, the response monitoring component 24 monitors the data of the responses that is read from the server side TCP socket 302 and written to the client side TCP socket 300 and the download categorising component.

It will be appreciated that each of the client side TCP socket 300 and the server side TCP socket 302 may have data buffers associated therewith for storing the TCP payload data.

Although this example has been described in the context of TCP, it will be appreciated that other suitable transport layer protocols may be used instead in the same or a similar way.

Transport Layer Security (TLS)/Secure Sockets Layer (SSL)

The Transport Layer Security (TLS) protocol and its predecessor the Secure Sockets Layer (SSL) protocol are cryptographic protocols for providing secure communications over a computer network. In the OSI model of computer networking the TLS/SSL protocols are in Layer 5 (the session layer).

Figure 7:
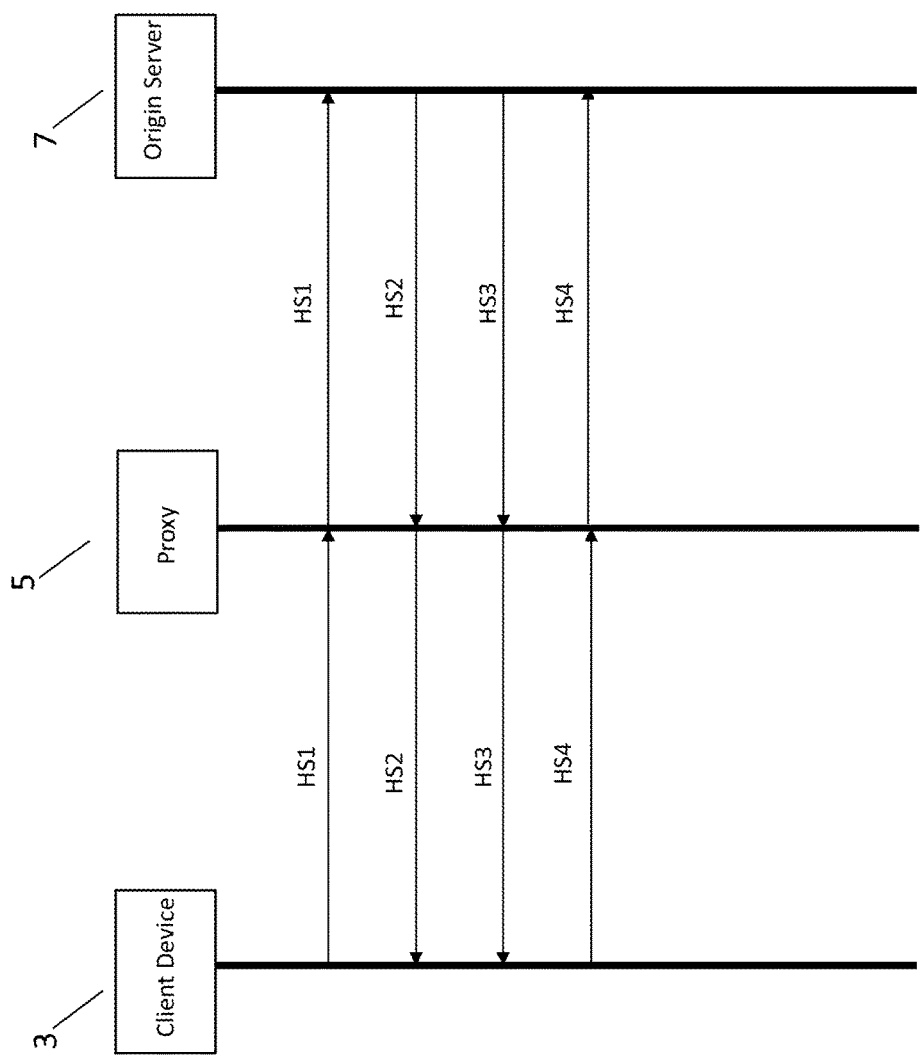
FIG. 7 is signaling diagram showing an exchange of handshake messages to set up a secure connection.

FIG. 7 shows a simplified version of the exchange of messages between the client device 3 and the origin server 7, via the Proxy 3, during a TLS/SSL handshake to establish a secure connection between the two. This handshake may occur prior to the data flows between the client device 3 and the origin server 7 illustrated in FIGS. 3 to 5, which would then take place over the secure connection.

The handshake begins when the client device 3 sends a 'ClientHello' message HS1 to the origin server 7 requesting a secure connection. The 'ClientHello' message HS1 may comprise the highest TLS version protocol it supports and a list of available cipher suites and a Server Name Indication (SNI) extension.

As is known in the art, the SNI indicates what hostname (e.g. xyz.com) that the client device 3 is attempting to connect to. The origin server 7 responds by sending to the client device 3 a 'ServerHello' message HS2 that, amongst other information, includes a chosen protocol version and a cipher suite. The origin server 7 then sends a message HS3 that includes the origin server's 7 digital certificate which contains the origin server's 7 domain name, the trusted certificate authority and the origin server's public encryption key. The client device 3 verifies the digital certificate and sends to the origin server 7 a message HS4 including a random number encrypted using the origin server's 7 public key which only the origin server 7 can decrypt with its private key. From the random number, the client device 3 and the origin server 7 generate a master secret and then, in steps not shown in FIG. 7, negotiate a session key for encryption and decryption. This concludes the handshake and begins the secured connection, which is encrypted and decrypted with the session key until the connection closes.

In some examples, the proxy server 5 extracts information from one or more of the messages exchanged between the client device 3 and the origin server 7 to establish a secure connection between the two and uses this information to infer more details about the content/media that is subsequently downloaded from the origin server 7 to the client device 5.

In one example, the proxy server 5 is arranged to parse the 'ClientHello' message and extract from it, if present, the domain of the origin server 7 (e.g. xyz.com) from the SNI and/or to parse the message from the origin server 7 that includes its certificate and extract, from the origin server's 7 certificate, the origin server's 7 domain.

The proxy server 5 may maintain a database of domain information that for each domain that has an entry in the database that indicates information that may be used to infer one or more details about media that is downloaded from the origin server 7.

For example, if a look-up in the database indicates that the domain name extracted from a handshake message is that of an app store and a subsequent analysis of a download over that connection from the origin server 7 to the client device 3 indicates that the download should be classified as 'single large file download', then the object can be more precisely classified as an "App Download". Alternatively, if the look-up indicates that the domain name is that of a video store, then the object can be more precisely classified as a "Video Download".

As another example, if it is known that a particular domain is configured to provide ABR streaming video segments that always represent T seconds (e.g. 10 seconds) of video playback time, then this information can be stored for that domain in the domain database so that if a download from that domain is classified as 'an ABR streaming video download, the proxy server 5 can determine further information about the download. For example, the proxy server 5 can determine an estimate of the playback bit rate of an individual segment of the video stream by dividing the estimated size of the response conveying that segment by determined playback time of a segment. Alternatively, the proxy server 5 can determine an estimate of the average playback bit rate of the media currently being download by summing the determined estimated sizes of a plurality of responses and dividing that sum by the total playback time of the segments conveyed by those responses (i.e. the playback time of an individual segment multiplied by the number of responses).

It should be appreciated that even though a priori analysis has shown or it is otherwise known that a domain provides a specific type of download or streaming content, other content types may also be delivered from the domain so flow analysis is still required to correctly classify the actual content type before the more precise classification is applied.

Use of Device Information

In other examples, the proxy server 5 may make use of device classification information that classifies the client device 3 as a particular class or type of device in order to infer more detail about the media that is being downloaded from the origin server 7 to the client device 5.

The device classification information may be obtained from the network or from observing other flows involving the client device 3.

For example, if a data flow involving the user device 3 is a non-secure HTTP flow, it is possible for the proxy server 5 to observer the User-Agent Field in the headers of the HTTP messages sent from the user device 3 and the User-Agent field may be used to classify the user device 3 as a phone or a desktop as the case may be.

Extending the ABR streaming example above, if a look-up in the database indicates that the domain name extracted from a handshake message is that of a video store and that video store provides video fragments to a desktop device that represent 10 s of playback time but video fragments to a mobile devices that represent 5 s of playback time, then classifying the user device 3 as either a mobile device or a desktop device enables the proxy server 5 when ABR streaming traffic is detected to correctly estimate the media bit-rate of the video stream by dividing a segment size by 5 s or 10 s depending upon whether the user device 3 is classified as a mobile or desk top device.

Use of User Application Information

In other examples, the proxy server 5 may make use of user application classification information that classifies the user application at the client device 3 as being a particular class or type of user application.

For example, extending further the streaming example given above, if the proxy server 5 identifies that the client device 3 is a mobile device and a look-up in the database indicates that a domain name extracted from a handshake message is that of a video store and that video store provides video segments to browsers on mobile devices that have a variable amount of playback time and provides video segments to a dedicated video playback app on mobile devices that have a fixed amount of playback time, then further knowledge that the user application at the user device 3 is a browser or is a dedicated video app player allows the download to be better categorised (i.e. as an adaptive video streaming download to a browser on a mobile device, or as an adaptive video streaming download to a fixed app on a mobile device. Furthermore, in this specific example, if the download is categorised as 'ABR streaming download to a dedicated video playing app on a mobile device' then the bit-rate of the video stream can be estimated by performing the calculation fragment size/Ts as already described above.

In one example, the proxy server 5 is arranged to parse the 'ClientHello' message and identify the set of extensions and/or cipher suites that are presented in it. This information may be used to infer what type of, or the identity of, the user application that is being used as the client device 3 and is involved in the data flow or what type of client device the client device 3. For example, it may be known that client app or device a sends cipher suites {1, 2, 3 4} in that order, client app or device b sends cipher suites {2, 3, 4, 5} in that order and client app or device c may send cipher suites {2, 3, 1, 4} in that order etc. and likewise for extensions. Accordingly, observed cipher suites and/or extensions may be used to query a database of cipher suites and/or extensions and the particular apps or devices known to use those cipher suites and/or extensions in order to identify the likely identity of the app or device using the observed cipher suites or extensions.

Session Analysis

In some examples, the proxy server 5 may correlate together information about concurrent and/or previous related flows (e.g. to the same destination address or from Layer 7 inspection) to drive a classification of a download.

For example, it is well known that many video playback client applications running on client devices will cause multiple TCP connections to be opened with a video server when downloading a video from that video server. The multiple TCP connections may be opened sequentially e.g. a first TCP connection may be opened and segments 1 and 2 of the video downloaded over it before the connection is closed and then a second TCP connection is then opened and segments 3 and 4 of the video downloaded over it before the connection is closed and so on.

The proxy server 5 may record the details of a connection opened between the client device 3 and the origin server 7 and may associate subsequently opened connections that have the same IP quadruplet (i.e. client IP address and TCP port, server IP address and TCP port) as the first connection as all belonging to same "download event". By effectively aggregating all of these connections together and treating them as a single connection, the proxy server 5 is able to monitor the entire downloading of the video and can accurately classify the downloading.

It will be appreciated that in the above described example of each connection being closed after two video segments have been downloaded over it, if each connection were considered separately by the proxy server 5, no connection would be used to download a sufficient number of consecutive video segments (e.g. 3 in the example of Table 1) to make an accurate classification. This is not the case if the proxy server 5 aggregates the connections together.

A client application running on a client device may also cause multiple TCP connections to be opened in parallel in order to download content from a content server using all of the opened TCP connections concurrently. For example a video client application can open multiple concurrent TCP connections to a video content store if the video and audio streams of a video to be downloaded are to be downloaded separately. Alternatively, a video client application may open multiple concurrent TCP connections to a video content store in order to download video segments in parallel to increase overall throughput. As with the example of sequentially opened connections discussed above, the proxy server 5 may aggregate the multiple concurrent connections together at a session level (based on their common IP quadruplet), effectively treating them as a single connection, allowing the downloading to be characterised correctly.

In general, video players will use sets of parallel flows opened sequentially over the duration of the video.

Often, if a client device and a server establish a first secure TCP connection (i.e. they set up a TCP connection and successfully perform a TLS/SSL handshake over it) and then close that first connection and immediately open a new second TCP connection, in order to secure the second TCP connection, the client and server use an abbreviated TLS/SSL handshake. The abbreviated TLS/SSL handshake re-uses the TLS/SSL session parameters established for the first connection. This avoids having to repeat a full handshake over the second connection but results in the SNI and/or server certificate not being transmitted over the new connection.

In examples where the proxy server 5 aggregates multiple TCP connections together, effectively treating them as a single connection, the proxy server 5 is able to make use of domain information that is only obtainable from the full TLS/SSL handshake used over the initially established connection for each of the aggregated connections. For example, as discussed above, the proxy server 5 may use domain information obtained from the full handshake to look up video segment duration information for that domain stored in the database and then use that video segment duration information to determine bit rates for each of the aggregated connections.

If the second and subsequent connections were not correlated with the first connection by the proxy server 5, then this would not be possible.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described hereinbefore.

Furthermore, embodiments of the invention can be embodied in the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital versatile disk (DVD).

Figure 8:
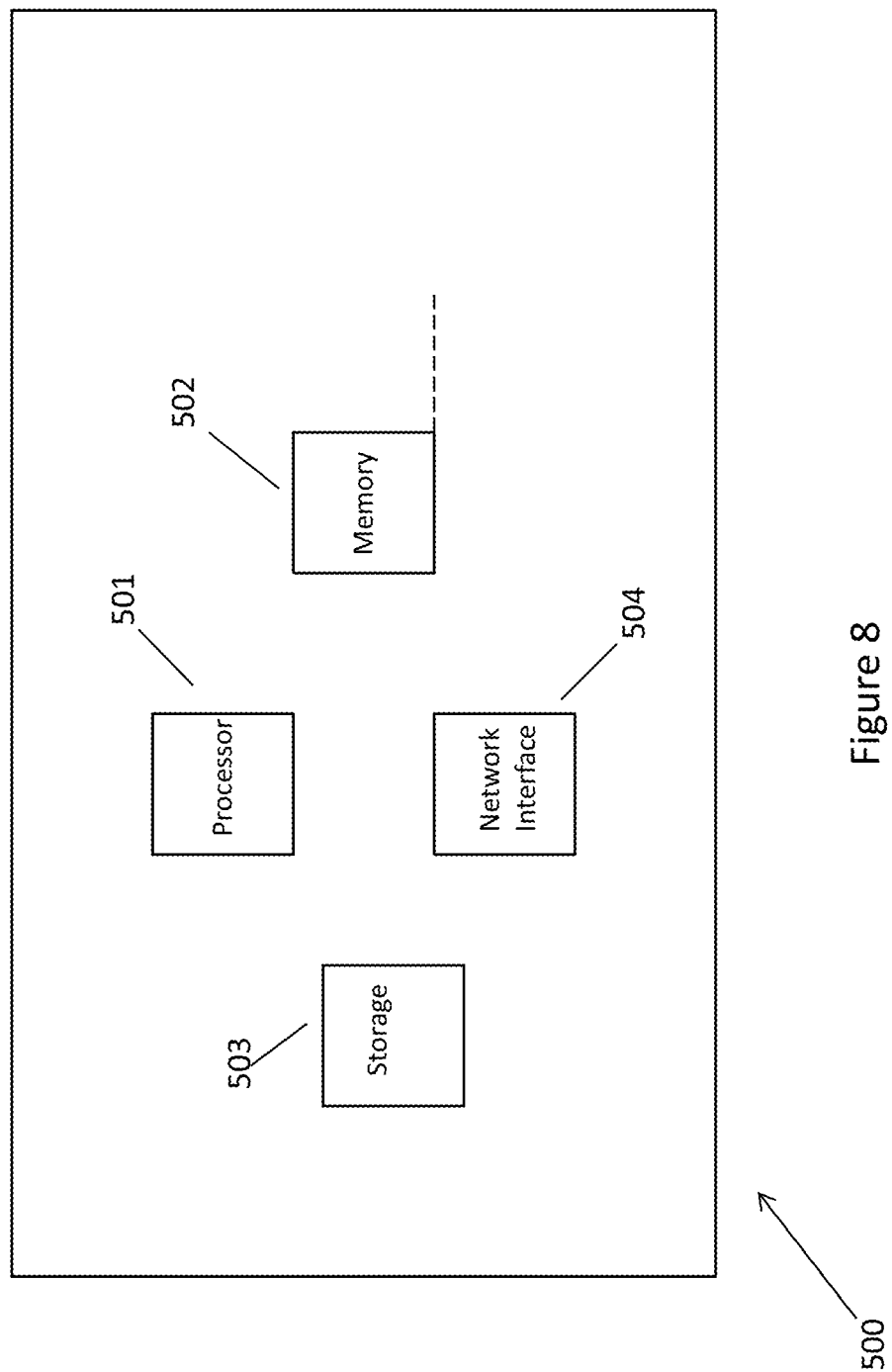
FIG. 8 is a schematic diagram of a proxy server in accordance with an embodiment of the invention.

The functionality of the embodiments depicted in FIGS. 1 to 7 is typically performed by a computer that executes computer readable instructions. FIG. 8 depicts a computer 500 that includes a processor 501, memory 502, storage 503 and a communications interface 504. The communications interface 504 enables communications with other computers in a network using suitable protocols, such as those discussed above. The computer executes computer readable instructions stored in storage 503 to implement embodiments of the invention as described hereinbefore.

The above embodiments are to be understood as illustrative examples of the invention. Further embodiments of the invention are envisaged. For example, in further embodiments, the intermediate network device 5, rather than determining the size of, or an estimate of the size of, each of the one or more Layer 7 protocol responses by monitoring data flowing through the network device at Layer 4 (i.e. the transport Layer) as described above, may instead do so by monitoring the data flow at Layer 3 (i.e. the IP or network layer instead). This approach would need to take account of IP packet re-transmissions (so that the payloads of re-transmitted packets are not counted multiple times) as well as IP and TCP header overheads. In this example, the intermediate network device 5 may be for example a router.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for categorizing a downloading of a resource to a user device from a resource server in a data network, the method comprising:

receiving, at an intermediate network device in the data network, data of one or more requests from the user device, wherein each of the one or more requests is a request for a different portion of, or the whole of, the resource to be downloaded to the user device;

forwarding the data of each of the one or more requests from the intermediate network device to the resource server;

receiving, at the intermediate network device, data of one or more responses from the resource server, each response corresponding to a respective one of the requests;

determining, at the intermediate network device, a size of, or an estimate of the size of, each of the one or more responses;

categorizing, at the intermediate network device, the downloading of the resource to the client device as being one of one or more pre-defined download categories, wherein the categorizing is based on a count of the one or more responses and the determined sizes or estimated sizes of the one or more responses, and on the count of the one or more responses reaching a predetermined threshold value and the determined size of, or the determined estimate of the size of, each of the one or more responses each being within a pre-defined data range.

2. The method of claim 1, wherein the one or more requests are Layer 7 protocol requests and the responses are Layer 7 protocol responses and wherein, determining, at the intermediate network device, a size of, or an estimate of the size of, each of the one or more Layer 7 protocol responses comprises monitoring data flowing through the intermediate network device at a Layer below Layer 7.

3. The method of claim 2, wherein the Layer below Layer 7 is Layer 4 or Layer 3.

4. The method of claim 1, wherein determining, at the intermediate network device, a size of, or an estimate of the size of, the one or more responses comprises receiving data at the intermediate network device from the resource server at a server side socket, reading the data from the server side socket and writing the data to a client side socket for onwards transmission to the user device.

5. The method of claim 4, wherein determining, at the intermediate server, a size of, or an estimate of the size of, the data of each of the one or more responses comprises counting the number of bytes that are read from the server side socket and are written to the client side socket.

6. The method of claim 1, wherein the count of the one or more responses reaching a predetermined threshold value is a count of consecutive responses.

7. The method of claim 1, wherein the one or more pre-defined categories comprise at least one of or two or more of: a web-page download; an Adaptive Bit Rate streaming download and a single file download.

8. The method of claim 1 wherein the one or more requests and the one or more the one or more responses are transmitted over one or more Layer 4 data connections.

9. The method of a claim 1, further comprising:
obtaining user device information that identifies or infers a category of or type of the user device;
using the information to further categorize the downloading of the resource.

10. The method of claim 9, further comprising:
obtaining the user device information by inspecting a message sent by the user device.

11. The method of claim 1, further comprising:
determining client application information that identifies or infers a category of or type of an application at the user device, which application is sending the one or more requests;
using the client application information to further categorize the downloading of the resource.

12. The method of claim 1, the method further comprising:
inspecting one or more messages sent from the user device to the resource server to establish a secure connection between the two;
inferring, from content in the one or more messages, the client application information.

13. The method of claim 1, further comprising:
obtaining resource server identity information that identifies a category of or type of the resource server;
using the resource server identity information to further categorize the downloading of the resource or to determine further information regarding the downloading of the resource.

14. The method of claim 13 further comprising:
inspecting one or more messages sent from the user device to the resource server to establish a secure connection between the two;
obtaining, from content in the one or more messages, the resource server identity information.

15. The method of claim 14, the method further comprising:
categorizing the download as being an adaptive video streaming download;
using the resource server identity information to look up segment playback time information regarding the resource server;
using the segment playback time information and the determined sizes of the responses to estimate a media playback data rate.

16. An apparatus for an intermediate network device for categorizing a downloading of a resource to a user device from a resource server in a data network, the apparatus comprising:
at least one processor;
and at least one memory including computer program code;
the at least one memory and the computer program code being configured to with the at least one processor, cause the apparatus at least to perform the steps of:
receiving, at the intermediate network device in the data network, data of one or more requests from the user device, wherein each of the one or more requests is a request for a different portion of, or the whole of, the resource to be downloaded to the user device;
forwarding the data of each of the one or more requests from the intermediate network device to the resource server;
receiving, at the intermediate network device, data of one or more responses from the resource server, each response corresponding to a respective one of the requests;
determining, at the intermediate network device, a size of, or an estimate of the size of, each of the one or more responses;
categorizing, at the intermediate network device, the downloading of the resource to the client device as being one of one or more pre-defined download categories, wherein the categorizing is based on a count of the one or more responses and the determined sizes or estimated sizes of the one or more responses, and on the count of the one or more responses reaching a predetermined threshold value and the determined size of, or the determined estimate of the size of, each of the one or more responses each being within a pre-defined data range.

17. A non-transitory computer readable storage medium comprising a set of computer readable instructions, which, when executed by a processing system causes the system to implement a method for categorizing a downloading of a resource to a user device from a resource server in a data network, the method comprising:
receiving, at the intermediate network device in the data network, data of one or more requests from the user device, wherein each of the one or more requests is a request for a different portion of, or the whole of, the resource to be downloaded to the user device;

forwarding the data of each of the one or more requests from the intermediate network device to the resource server;

receiving, at the intermediate network device, data of one or more responses from the resource server, each response corresponding to a respective one of the requests;

determining, at the intermediate network device, a size of, or an estimate of the size of, each of the one or more responses;

categorizing, at the intermediate network device, the downloading of the resource to the client device as being one of one or more pre-defined download categories, wherein the categorizing is based on a count of the one or more responses and the determined sizes or estimated sizes of the one or more responses, and on the count of the one or more responses reaching a predetermined threshold value and the determined size of, or the determined estimate of the size of, each of the one or more responses each being within a pre-defined data range.

* * * * *